United States Patent
Liu et al.

(10) Patent No.: US 7,230,654 B2
(45) Date of Patent: Jun. 12, 2007

(54) CHANNEL ACQUISITION PROCESSING FOR A TELEVISION RECEIVER

(75) Inventors: Weixiao Liu, Indianapolis, IN (US); Aaron Reel Bouillet, Noblesville, IN (US); Matthew Thomas Mayer, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 444 days.

(21) Appl. No.: 10/511,645

(22) PCT Filed: Apr. 14, 2003

(86) PCT No.: PCT/US03/11448

§ 371 (c)(1),
(2), (4) Date: Oct. 18, 2004

(87) PCT Pub. No.: WO03/090441

PCT Pub. Date: Oct. 30, 2003

(65) Prior Publication Data

US 2005/0254601 A1   Nov. 17, 2005

Related U.S. Application Data

(60) Provisional application No. 60/374,029, filed on Apr. 19, 2002.

(51) Int. Cl.
*H04N 5/455* (2006.01)

(52) U.S. Cl. ............ 348/726; 348/725; 348/731; 375/324; 375/326

(58) Field of Classification Search ........ 348/725–726, 348/731–732, 426, 737; 375/321, 324, 326, 375/344, 320, 270, 277, 235; *H04N 5/455*
See application file for complete search history.

(56) References Cited

U.S. PATENT DOCUMENTS

| | | | |
|---|---|---|---|
| 5,818,544 A * | 10/1998 | Han | ............................ 348/725 |
| 5,870,438 A * | 2/1999 | Olafsson | ..................... 375/344 |
| 6,133,964 A | 10/2000 | Han | |
| 6,226,323 B1 | 5/2001 | Tan et al. | |
| 6,298,100 B1 | 10/2001 | Bouillet | |
| 6,317,162 B1 | 11/2001 | Matsumoto | |
| 6,359,944 B1 | 3/2002 | Curtis, III et al. | |
| 6,459,745 B1 * | 10/2002 | Moose et al. | ............... 375/355 |
| 6,671,002 B1 * | 12/2003 | Konishi et al. | ............. 348/725 |

OTHER PUBLICATIONS

Search Report Dated Oct. 9, 2003.

* cited by examiner

*Primary Examiner*—Trang U. Tran
(74) *Attorney, Agent, or Firm*—Joseph J. Laks; Ronald H. Kurdyla

(57) ABSTRACT

Channel acquisition in a digital television signal receiver is improved by determining the carrier tracking loop frequency offsets and the symbol timing recovery offsets for each channel in the television receiver. Offsets are stored in respective EEPROMs for each channel. When a channel is to be acquired in the TV receiver the tune command will be applied to the appropriate EEPROMs and the respective values are conveyed to the VSB demodulator to start acquisition of the channel.

17 Claims, 2 Drawing Sheets

CHANNEL ACQUISITION PROCESSING FOR A TELEVISION RECEIVER

This application claims the benefit, under 35 U.S.C. § 365 of International Application PCT/US03/11448, filed Apr. 14, 2003, which was published in accordance with PCT Article 21(2) on Oct. 30, 2003 in English and which claims the benefit of U.S. Provisional Patent Application No. 60/374,029 filed Apr. 19, 2002.

BACKGROUND

1. Field of the Invention

The present invention relates to a method and apparatus for facilitating the tuning of a digital television receiver with respect to a transmitted signal. More particularly, the present invention relates to a method and apparatus for permitting a vestigial sideband (VSB) demodulator to lock on to a channel for reception by controlling the starting points of the carrier tracking loop and the symbol timing recovery loop.

2. Discussion of the Related Art

Any terrestrial digital TV system must overcome a number of problems in transmitting signals to a receiver. The United States has adopted the Advanced Television System Committee (ATSC) System using eight level vestigial sideband (8-VSB) modulation as its digital television standard. The recovery of data from such modulated signals containing digital information in symbol form usually requires three functions at a receiver: timing recovery for symbol synchronization, carrier recovery (frequency demodulation to base band) and channel equalization.

Both symbol and carrier frequencies are specified in the transmission standard. However, because of hardware parameter drift in both the transmitter and receiver, the actual carrier frequency and symbol timing may vary from the specified values. The difference between the actual carrier frequency and symbol timing and the specified carrier frequency and symbol timing is termed 'offset'. When a new channel is tuned, the presence of offsets in the carrier frequency and symbol timing must be detected and the receiver VSB demodulator circuitry adapted to receive the actual carrier and symbol frequencies.

One problem is that it may take a long time for the VSB demodulator to acquire a "lock" on a channel if the starting points of the carrier tracking loop (CTL) and symbol timing recovery (STR) loops are far away from their locked frequencies. This may occur, for example, if a previous channel had carrier and/or symbol frequency offsets at one end of the allowable range of frequencies, and the new channel has carrier and/or symbol frequency offsets at the other end of the allowable range of frequencies. This problem is aggravated when the CTL and STR loop bandwidths are set low to ensure reliable acquisition and tracking. It is even possible that lock will not be achieved if the difference is too large.

To achieve carrier recovery in accordance with adopted United States standards, a small pilot signal at the suppressed carrier frequency is added to the transmitted signal to help achieve carrier lock at a VSB receiver. This pilot tone is detected and the CTL adapted to lock to the frequency of the pilot tone.

To achieve symbol timing recovery in accordance with adopted United States standards, the symbol stream is analyzed to detect embedded synchronization signals. Each data frame comprises two fields, each field including 313 segments, each segment including 832 multilevel symbols. The first segment of each field is referred to as a field sync segment and the remaining 312 segments are referred to as data segments. Every segment includes a four-symbol segment sync sequence all having the same four-symbol value. Each field sync segment includes the segment sync sequence followed by a field sync component comprising a predetermined 511 symbol pseudorandom number (PN) sequence and three predetermined 63-symbol PN sequences. The middle PN sequence is inverted in successive fields. A VSB mode control signal (defining the VSB symbol constellation size) follows the last 63-symbol PN sequence which is followed by 96 reserved symbols and 12 symbols copied from the previous field. Each data segment also comprises the four-symbol segment sync sequence followed by 828 data symbols. The data symbols typically contain MPEG compatible data packets. The timing of the four symbol segment sync characters are detected and used to adapt the STR circuitry to lock to the symbol frequency. A full description of this system can be found in the 1994 proceedings of the National Association of Broadcasters, 48th Annual Broadcast Engineering Conference, Mar. 20–24, 1994, the contents of which are incorporated herein as a reference.

A receiver which will lock to a newly tuned channel without a long delay, and without the possibility of not locking at all is desirable. The present invention deals specifically with a method and apparatus for a more reliable and faster acquisition of symbol and carrier lock for a transmitted channel in the receiver.

SUMMARY OF THE INVENTION

The inventors have realized that when a channel is tuned, the locked values of the CTL offset and STR offset for the new channel will most likely be the same as, or close to, the locked offsets for that same channel the last time it was tuned. Therefore, the present invention solves the above problems by storing data representing the CTL and STR offsets when a channel is locked. These stored offsets are then utilized as the starting points when that channel is to be again acquired. Because the CTL and STR integrators have less to traverse from the stored offset values to the new CTL and STR offsets, it will take less time for the CTL and STR acquisitions to be achieved.

In accordance with the principles of the present invention the CTL and STR offsets are stored in an EEPROM for each channel when the VSB demodulator is locked on to a channel. These stored CTL and STR offsets are recalled from the EEPROM and used as tuning parameters for subsequent tuning operations to speed up channel acquisition time.

Thus in a preferred method of the present invention, a VSB demodulator in a television receiver is enabled to efficiently lock onto a channel corresponding to the channel in which a received television signal was transmitted. This method includes the steps of determining the respective carrier tracking loop offsets for each channel in the television receiver and storing each of such offsets as first offsets. The respective symbol timing recovery offsets are then determined for each channel in the television receiver as well. Each of these symbol timing recovery offsets are stored as second offsets. The corresponding first and second offsets for each channel are recalled from the storage means as desired by a tune command so that the demodulator can use such recalled offsets for starting acquisition of the desired channel.

In accordance with a preferred method incorporating the principles of the present invention, the carrier tracking loop offsets are stored in a plurality of first EEPROMs, each of which corresponds respectively to a different television channel. The symbol timing recovery offsets are stored in a plurality of second EEPROMs, each of the second EEPROMs corresponding respectively to a different television channel. The offsets from each of the first and second EEPROMs for a respective channel are recalled as desired by a tune command. The demodulator thereby uses the recalled offsets as a starting point in acquiring the desired channel.

In a further preferred method incorporating the principles of the present invention, the carrier tracking loop offsets are determined by locking each channel in the receiver to its respective transmitter channel and noting the carrier loop offset for such locked channel.

Similarly a preferred method includes determining the symbol timing recovery offset by locking each channel in the receiver to its respective transmitter channel and noting the symbol timing recovery offsets for said locked channel.

In a preferred embodiment of the present invention, apparatus is provided for enabling a VSB demodulator in a television receiver to efficiently lock onto a channel corresponding to the channel in which a received television signal was transmitted. This apparatus includes means for determining the respective carrier tracking loop offsets for each channel in the television receiver. First storage means are provided for storing each of the offsets as first offsets. Also included are means for determining the respective symbol timing recovery offsets for each channel in the television receiver and second storage means are included for storing each of the symbol timing recovery offsets as second offsets. Finally means are provided for recalling the corresponding first and second offsets for each channel from the first and second storage means, respectively, as desired by a tune command, the demodulator thereby using the recalled offsets for starting acquisition of the desired channel.

In a further preferred embodiment of the present invention the apparatus for storing the offsets are a plurality of first and second electrically erasable programmable read only memories (EEPROMs).

DETAILED DESCRIPTION

Figure 1:
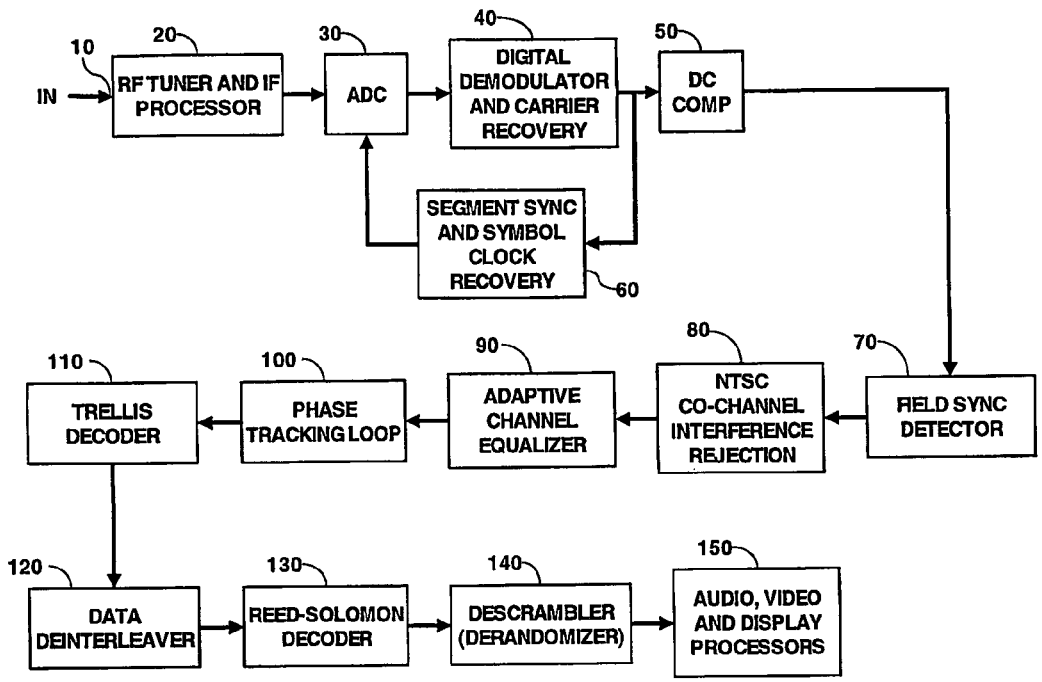
FIG. 1 is a block diagram of a VSB receiver incorporating the principles of the present invention.

Referring to the drawings and more particularly to FIG. 1, a terrestrial broadcast analog input (HDTV) signal is received by an antenna (not illustrated) and applied as an input 10 to a network 20 which includes RF tuning circuits and an intermediate frequency processor. The IF processor includes a double conversion tuner for producing an IF passband output signal at a nominal fixed IF carrier frequency. As described above, the actual IF carrier frequency may be offset from the nominal frequency. The network 20 also includes the appropriate automatic gain control (AGC) circuits.

The received signal is a carrier suppressed 8-VSB modulated signal as proposed by the Advanced Television Standards Committee (ATSC) Television Digital Standard dated Sep. 16, 1995 adopted by the United States and incorporated herein by reference. Such a VSB signal is represented by a one-dimensional data symbol constellation wherein only one axis contains quantized data to be recovered by the receiver.

In the 8-VSB transmitted signal, the digital information is transmitted exclusively in the amplitude, of the RF envelope and not in the phase. The eight levels of the transmitted signal are recovered by sampling the I channel or in-phase information. Since any dependence on the Q-channel is eliminated, the 8-VSB receiver has only to process the I channel thereby cutting in half the number of digital signal processing circuits required in the different stages of the receiver. It is clear that this results in greater simplicity and cost savings in the receiver design.

As noted above the output of the network 20 is an IF passband output signal. This signal is applied to an analog-to-digital converter (ADC) 30, which produces an oversampled digital datastream. In the illustrated embodiment, the analog-to-digital converter 30 oversamples the input 10.76 mega symbols (Msamples) per second VSB symbol datastream with a 21.52 MHz sampling clock. This is twice the received symbol rate. This provides an oversampled 21.52 Msamples per second datastream with two samples per symbol. The use of such two samples per symbol sample based processing rather than a one sample per symbol based processing produces advantageous operation of subsequent signal processing functions such as are associated with symbol timing recovery using the Gardner algorithm or the subsequent DC compensation unit 50, for example.

The datastream from ADC 30 is demodulated to baseband by applying the datastream to a network 40 which is an all-digital demodulator with a carrier tracking loop (CTL) network. The CTL network 40 carries out this function by utilizing an all-digital phase locked loop (PLL) locking to the small reference pilot carrier in the received VSB datastream. This all-digital PLL includes a digital implementation of a phase detector detecting the phase difference between a local oscillator signal and the pilot signal, a loop filter operating as an integrator to track the IF carrier frequency and a numerically controlled oscillator to generate the local oscillator signal having a frequency controlled in response to the output signal from the integrator. The design and implementation of such a digital PLL is well known to one skilled in the art and will not be illustrated or discussed in more detail. The unit 40 produces an output I-phase demodulated symbol datastream.

Associated with the ADC network 30 and the demodulator 40 is a segment sync and symbol clock recovery network 60. Network 60 detects and separates the repetitive segment sync sequence in each segment from the random data. The network 60 also includes a digital PLL including a phase detector for detecting the phase difference between the sampling clock signal and the time locations of the segment sync sequences, a loop filter acting as an integrator to track the symbol frequency, and a numerically controlled oscillator to generate the sampling clock having a frequency controlled in response to the output of the integrator. As discussed above, the design and implementation of such a digital PLL is well known to one skilled in the art and will not be illustrated or discussed in more detail. In this manner, the time locations of the segment sync components are used to regenerate a properly phased 21.52 MHz clock which is used to control the datastream symbol sampling by the ADC 30.

Once the circuit 60 acquires a lock on the symbols in the received channel the receiver clock is synchronized with the transmitter clock and the sample clock is fed back to the analog-to-digital converter 30 (and other circuits in the receiver, not shown to simplify the figure). When this is done, the VSB receiver is tuned to the appropriate channel and such receiver can function in an appropriate manner.

As noted above it may take a long time for the VSB demodulator circuit 40 to acquire a "lock" on a channel if the starting points of the carrier tracking loop and the symbol timing recovery loop are far away from their new locked frequencies. As also indicated above, this problem is aggravated when the CTL and STR loop bandwidths are set low to insure reliable acquisition.

Figure 2:
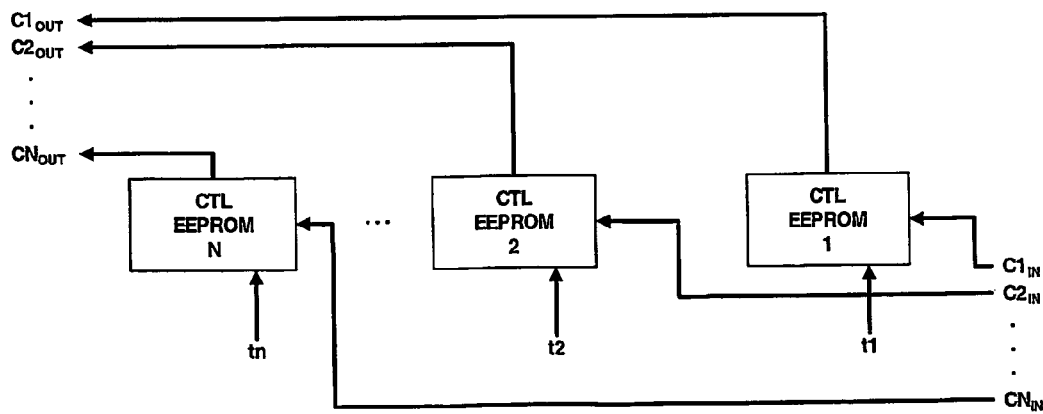
FIG. 2 is a functional block diagram of the carrier tracking loop EEPROMs forming a portion of the block 40 of FIG. 1.

In accordance with the present invention, this time period can be substantially reduced. FIG. 2 is a functional block diagram, illustrating a plurality N of carrier tracking loop EEPROMs 1-N (42, 44, 46) which are arranged as part of the digital demodulator and carrier recovery circuit 40. In general, when a channel is locked, a value representing the locked CTL offset is stored in an EEPROM memory corresponding to that channel. When that channel is next selected to be tuned, the previously stored offset value is used as a starting point for CTL carrier acquisition.

In FIG. 2, an input terminal $C_{IN}$ is coupled to a source (not shown) of a value representing the current CTL offset in the CTL 40. The $C_{IN}$ terminal is coupled in common to respective input terminals of the plurality of CTL EEPROMs 42, 44 and 46. Respective output terminals of the CTL EEPROMs 42, 44 and 46 are coupled in common to an output terminal $C_{OUT}$. The output terminal $C_{OUT}$ is coupled to circuitry (not shown) in the CTL 40 which can set the CTL offset to the value at the output terminal $C_{OUT}$. Respective control signals t1, t2 and tn are coupled to corresponding control input terminals of the CTL EEPROMs 42, 44 and 46 and control the operation of the corresponding CTL EEPROM 42, 44, 46.

In accordance with the present invention, when the receiver is locked onto a particular channel such as channel 1, for example, the CTL offset value for channel 1 is received at the input terminal $C_{IN}$ and stored in the CTL EEPROM 1, 42, corresponding to channel 1, in response to the control signal t1. This value may be the numerical value supplied to the numerically controlled oscillator in the PLL in the CTL circuitry 40, or any other value which represents the locked offset value for the CTL circuitry 40. Similarly when the receiver is locked to a second channel such as channel 2, for example, the CTL offset value from the input terminal $C_{IN}$ for channel 2 is stored in the CTL EEPROM 2, 44, corresponding to channel 2, in response to the control signal t2. An EEPROM corresponding to each of N channels is provided in the unit 40. This is evidenced by the dotted lines leading up to the last EEPROM N, 46. Thus after the receiver has been locked onto each channel, the respective carrier tracking loop frequency offsets have been stored in the EEPROMs corresponding to each channel.

Figure 3:
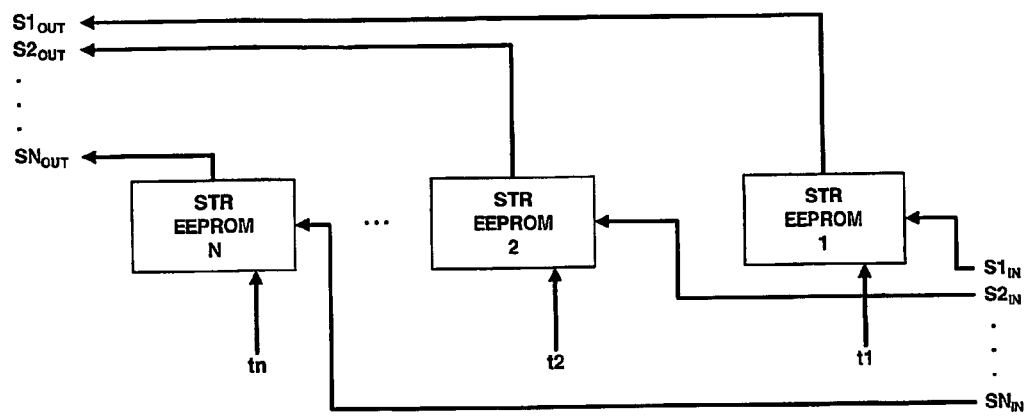
FIG. 3 is a functional block diagram of the symbol timing recovery EEPROMs forming a portion of block 60 of FIG. 1.

Similarly, the segment sync and symbol timing recovery circuit 60 includes STR EEPROM storage elements 1-N, 62, 64, 66, shown in FIG. 3. As with the carrier tracking loop, as each channel is locked in the receiver, a value representing the symbol frequency offset is store in the STR EEPROM, 62, 64, 66 corresponding to that channel. That value is retrieved and used as the starting symbol timing offset when that channel is next selected to be tuned.

FIG. 3 is similar to FIG. 2. In FIG. 3, an input terminal $S_{IN}$ is coupled to a source (not shown) of a value representing the current symbol timing offset in the STR 60, which may be the value supplied to the numerically controlled oscillator in the STR 60, or any other value representing the symbol timing offset. The $S_{IN}$ terminal is coupled in common to respective input terminals of the plurality of STR EEPROMs 62, 64 and 46. Respective output terminals of the STR EEPROMs 62, 64 and 66 are coupled in common to an output terminal $S_{OUT}$. The output terminal $S_{OUT}$ is coupled to circuitry (not shown) in the STR 60 which can set the STR offset to the value at the output terminal $S_{OUT}$. Respective control signals t1, t2 and tn, which may be the same control signals illustrated in FIG. 2, are coupled to corresponding control input terminals of the STR EEPROMs 62, 64 and 66 and control the operation of the corresponding STR EEPROM 62, 64, 66. Similarly to the CTL 40, described above, when a channel is locked, the current symbol timing offset value at the input terminal $S_{IN}$ is stored in the STR EEPROM 62,64,66 corresponding to that channel in response to a control signal t1,t2,tn.

Further in accordance with the principles of the present invention when the receiver is to be tuned to a new channel, the receiver supplies respective control signals t1–tn to the CTL and STR EEPROMs 42,44,46 and 62,64,66. The control signal to the CTL and STR EEPROM (42,44,46 & 62,64,66) corresponding to the channel to be tuned conditions that EEPROM to retrieve the previously saved CTL offset and STR offset, respectively, and supply the retrieved values to the respective output terminals $C_{OUT}$ and $S_{OUT}$. In this manner, the receiver conveys the previously saved CTL offset for that channel to the demodulator 40 which can then use the retrieved CTL offset value as the starting carrier frequency offset, and conveys the previously saved STR offset value for that channel to the symbol clock recovery circuit 60 which can then use the retrieved STR offset value as the starting symbol timing offset. The receiver then commences acquisition of the channel to which the receiver is to be tuned.

Because the carrier tracking loop and the symbol timing recovery offsets were stored in the corresponding EEPROMs for each channel the last time the channels were locked, these stored values can be used as initial offsets for subsequent tuning operations to those channels to speed up the channel acquisition times. Starting the CTL and the STR loops at the previously locked offset values can substantially reduce the time of acquisition as compared to the normal receiver where such values have not been stored and there is no opportunity to use these previously determined values as starting acquisition points. This is especially the case where the initial tuning offsets for a newly tuned channel will be the offsets for the previously tuned channel, which are totally unrelated and may be much different.

One skilled in the art will recognize that EEPROMs are non-volatile memories which maintain the data stored in them even if power is removed. Thus, the information stored in the CTL EEPROMs 42–46 and the STR EEPROMs 62–66 will remain stored in the system even if the receiver is turned off, or suffers a power failure. Though EEPROMs have been illustrated as the non-volatile memories, one skilled in the art will understand that any form of non-volatile memory, known now or developed in the future, may be used, such as battery operated RAM, or magnetic storage such as disk, tape or core storage.

One skilled in the art will further understand that the respective EEPROMs (42,44,46 & 62,64,66) need not be physically separate EEPROMs, but instead may be respective locations within a single EEPROM, or, if necessary, a plurality of multi-location EEPROMs. In this case, addressing circuitry, corresponding to the separate control signals t1, t2, tn, of known design, may be used to store the CTL and STR offset values for a channel in the EEPROM location corresponding to that channel when that channel is locked, and to retrieve that value from the associated location when that channel is newly selected.

Once the VSB receiver is locked to the appropriate channel the demodulated VSB signal is applied to a DC compensation unit 50 which uses an adaptive tracking circuit to remove from the demodulated VSB signal a DC offset component caused by the pilot signal component. The output of the DC compensation circuit 50 is applied to a field sync detector 70 and an NTSC co-channel interference rejection circuit 80. The output of circuit 80 is applied to an adaptive channel equalizer 90, which corrects channel distortions. Phase noise can randomly rotate the symbol constellation so the output of the equalizer 90 is applied to a phase tracking loop 100 which removes the residual phase and gain noise in the output signal from the equalizer 90. This includes phase noise which has not been removed by the preceding carrier recovery network 40 in response to the pilot signal. The phase corrected signal output from the phase tracking loop 100 is then trellis decoded by the unit 110, de-interleaved by unit 120, Reed-Solomon error corrected by unit 130, and descrambled or derandomized by unit 140. Afterwards the decoded datastream is subjected to audio, video and display processing by the unit 150. The tuner and IF processor unit 10, the ADC 30, DC compensation circuit 50, the field sync detector 70, the NTSC filter 80, the equalizer 90, the phase tracking loop 100, the trellis decoder 110, the de-interleaver 120, the Reed-Solomon decoder 130 and the descrambler 140 may employ circuits of the type described in the Grand Alliance HDTV system specification dated Apr. 14, 1994 and incorporated herein by reference.

The all-digital demodulator circuit 40 and/or symbol clock recovery circuit 60 may be fabricated by dedicated digital hardware circuits supplying the necessary functions, including the EEPROMs described above, in accordance with the present invention. Alternatively, the demodulator circuit 40 and/or symbol clock recovery circuit 60 may be fabricated by a processor controlled in a known manner by a control program to receive input signals, process those signals in accordance with the instructions of the control program, and generate processed output signals. Further, a combination of a processor and dedicated hardware may also be used, and one skilled in the art will understand how to partition the design into dedicated hardware, e.g. the EEPROMS, and a processor providing signal processing, and how to design and implement such a system and to interconnect the processor and the dedicated hardware.

The present invention has been described with respect to a particular method and apparatus and a particular illustrative example such as using EEPROMs as the storage media. More specifically, the present invention has been described in the context of a television receiver for receiving a desired one of a plurality of channels over which a television signal may be transmitted. It is evident, however, that the principles of the present invention may be embodied in other methods and arrangements without departing from the spirit and scope of the present invention as defined by the following claims.

The invention claimed is:

1. A method for enabling a demodulator in a receiver to efficiently lock onto a desired one of a plurality of channels over which a received signal may be transmitted, comprising the steps of:
   determining the respective carrier tracking loop frequency offset corresponding to each channel in the receiver;
   storing each of said carrier tracking loop frequency offsets as first offsets;
   determining the respective symbol timing recovery frequency offset corresponding to each channel in the receiver;
   storing each of said symbol timing recovery frequency offsets as second offsets; and
   retrieving said first and second offsets corresponding to the desired channel, said demodulator thereby using said recalled offsets for starting acquisition of said desired channel.

2. A method as claimed in claim 1 wherein each respective carrier tracking loop frequency offset is determined by locking the receiver to each respective transmitted channel and noting the carrier loop offset for said locked channel.

3. A method as claimed in claim 2 wherein each symbol timing recovery frequency offset is determined by locking the receiver to each respective transmitted channel and noting the symbol timing recovery offset for said locked channel.

4. A method as claimed in claim 1 wherein each symbol timing recovery frequency offset is determined by locking the receiver to each respective transmitted channel and noting the symbol timing recovery offset for said locked channel.

5. A method for enabling a VSB demodulator 40 in a digital television receiver to efficiently start acquisition of a received television signal on a desired one of a plurality of channels over which said television signal may be transmitted, comprising the steps of:
   determining the respective carrier tracking loop frequency offset corresponding to each channel of the digital television receiver;
   storing each of said carrier tracking loop frequency offsets in a plurality of first non-volatile memories, each of said first non-volatile memories corresponding respectively to a different television channel;
   determining the respective symbol timing recovery frequency offset corresponding to each channel of the digital television receiver;
   storing each of said symbol timing recovery frequency offsets in a plurality of second non-volatile memories, each of said second non-volatile memories corresponding respectively to a different television channel; and
   retrieving said offsets from each of said first and second non-volatile memory corresponding to the desired channel, said demodulator thereby using said retrieved offsets as a starting point in acquiring said desired channel.

6. A method as claimed in claim 5 wherein said respective pluralities of first and second non-volatile memories are EEPROMS.

7. A method as claimed in claim 5 wherein each respective carrier tracking loop frequency offset is determined by locking the receiver to each respective transmitted channel and noting the carrier loop offset for said locked channel.

8. A method as claimed in claim 7 wherein each symbol timing recovery frequency offset is determined by locking the receiver to each respective transmitted channel and noting the symbol timing recovery offset for said locked channel.

9. A method as claimed in claim 5 wherein each symbol timing recovery frequency offset is determined by locking the receiver to each respective transmitted channel and noting the symbol timing recovery offset for said locked channel.

10. Apparatus for enabling a VSB demodulator in a television receiver to efficiently lock onto a desired one of a plurality of channels over which a received television signal may be transmitted, comprising:
- a demodulator for determining the respective carrier tracking loop frequency offset corresponding to each channel in the television receiver;
- first non-volatile memory means for storing each of said carrier tracking loop frequency offsets as first offsets;
- a symbol clock recovery circuit for determining the respective symbol timing recovery frequency offset corresponding to each channel in the television receiver;
- second non-volatile memory means for storing each of said symbol timing recovery frequency offsets as second offsets; and
- means for retrieving said first and second offsets corresponding to the desired channel from said first and second non-volatile memory means, said demodulator thereby using said retrieved offsets for starting acquisition of said desired channel.

11. Apparatus as claimed in claim 10 wherein said first non-volatile memory means is a first plurality of EEPROMS and said second non-volatile memory means is a second plurality of EEPROMS.

12. Apparatus as claimed in claim 11 wherein said demodulator includes means for locking the clock in the receiver to the carrier for the respective transmitted channel and indicating the carrier loop offset for said locked channel.

13. Apparatus as claimed in claim 11 wherein said symbol clock recovery circuit includes means for locking the clock in the receiver to the symbol timing for the respective transmitted channel and indicating the symbol timing recovery offset for said locked channel.

14. Apparatus as claimed in claim 13 wherein said demodulator includes means for locking the clock in the receiver to the carrier for the respective transmitted channel and indicating the carrier loop offset for said locked channel.

15. Apparatus as claimed in claim 10 wherein said demodulator includes means for locking the clock in the receiver to the carrier for the respective transmitted channel and indicating the carrier loop offset for said locked channel.

16. Apparatus as claimed in claim 10 wherein said symbol clock recovery circuit includes means for locking the clock in the receiver to the symbol timing for the respective transmitted channel and indicating the symbol timing recovery offset for said locked channel.

17. Apparatus as claimed in claim 16 wherein said demodulator includes means for locking the clock in the receiver to the carrier for the respective transmitted channel and indicating the carrier loop offset for said locked channel.

* * * * *